2,514,902

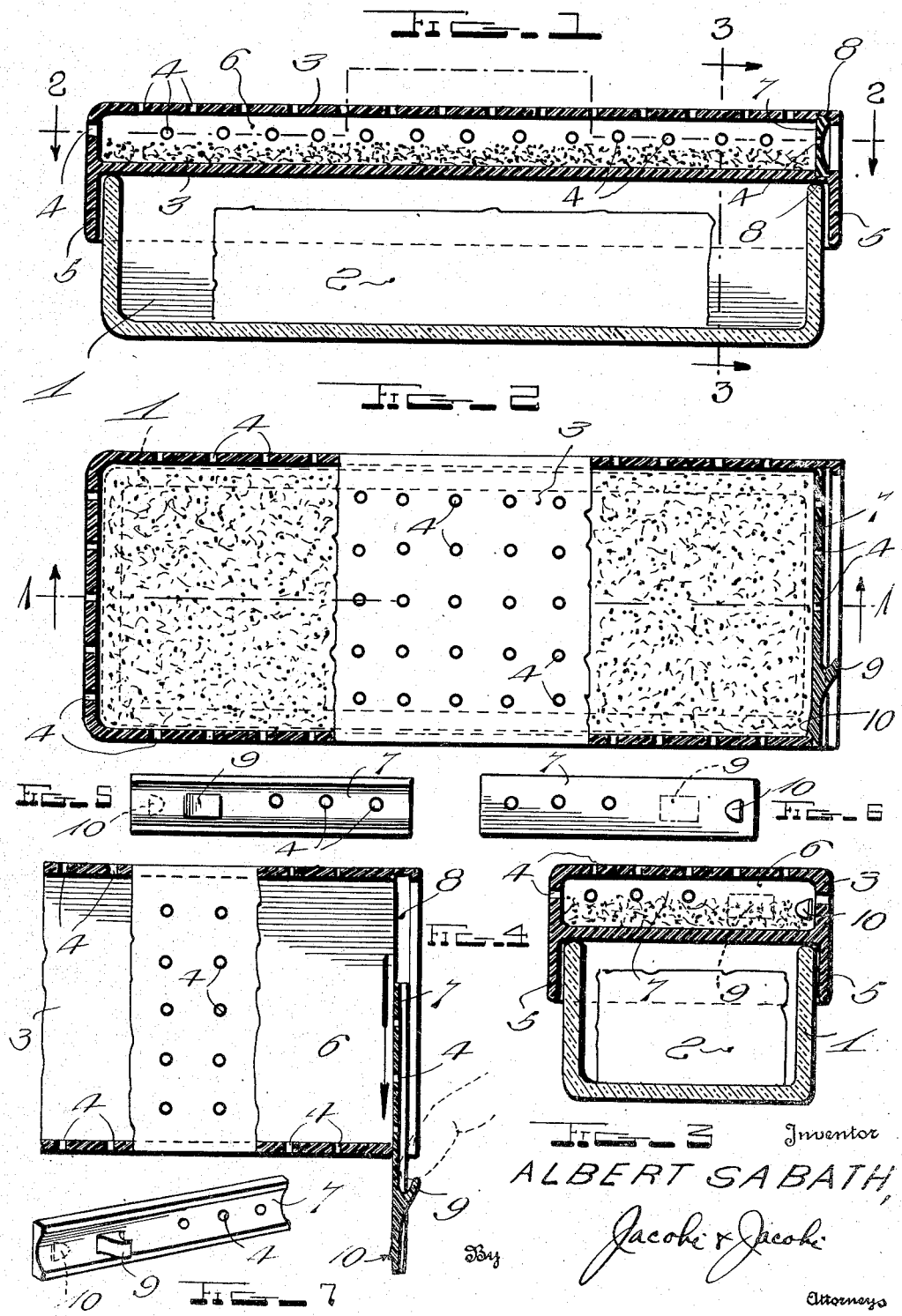
July 11, 1950  A. SABATH  2,514,902
COMBINATION FOOD CONTAINER AND DEODORIZER
Filed Dec. 7, 1945
Inventor
ALBERT SABATH Patented July 11, 1950

UNITED STATES PATENT OFFICE 2,514,902

COMBINATION FOOD CONTAINER AND DEODORIZER

Albert Sabath, Miami Beach, Fla.

Application December 7, 1945, Serial No. 633,486

1 Claim. (Cl. 183—4.8)

My invention relates to new and useful improvements in certain articles of manufacture and more particularly to a combination food container and deodorizer, the principal object of the invention being to provide a container for foods, such as butter or the like, the top for which is designed and constructed to contain a deodorizing element or agent.

A further object of the invention resides in providing a combination container and deodorizer, so constructed and designed that the deodorizing device, while forming a top for the food container, may be removed and utilized as a deodorizing device for use in refrigerators separate and distinct from the container.

Still another object of the invention resides in so constructing the top of the container that the deodorizing element or agent may be introduced therein or removed readily.

Still another object of the invention resides in providing a device which is simple and durable in construction, inexpensive to manufacture and one which will be very efficient and useful in operation.

With these and numerous other objects in view, my invention consists in the novel features of construction, combination and arrangement of parts, as will be hereinafter referred to and more particularly pointed out in the specification and claims.

In the accompanying drawing, forming a part of this application

Fig. 1 is a vertical longitudinal section through a container embodying my new improvements;

Fig. 2 is a horizontal section therethrough as seen on the line 2—2 of Fig. 1;

Fig. 3 is a vertical transverse section therethrough as seen on the line 3—3 of Fig. 1, looking in the direction of the arrows;

Fig. 4 is a fragmentary horizontal section through the device, partly in elevation, showing the closure for the deodorizing top of the container in partially opened position;

Fig. 5 is a front elevation of the closure of the deodorizing element removed;

Fig. 6 is a rear elevation of said closure; and

Fig. 7 is a perspective view of the closure of the deodorizer.

In describing the invention, I shall refer to the drawing in which similar reference characters designate corresponding parts throughout the several views and in which the numeral 1 designates a food container such as a butter dish made of glass, plastic or similar material, there being illustrated therein a food designated by the numeral 2 which may, for convenience, be referred to as a block of butter. This is a more or less conventional type of container such as usually provided for retaining butter in refrigerators, it being contemplated under my invention, to provide a specific top for such a container which, while serving as a top for the dish, will also be provided with means for deodorizing the refrigerator in which the dish is contained and keep the contents of the dish or container free from contaminating odors.

To this end I provide a top for the container 1 which I have designated generally by the numeral 3. This top member is of the same general configuration as the container 1, which, in the drawing herewith presented, is rectangular, although I do not wish to be limited to any particular shape, configuration or size. This top member 3 is of hollow design, thereby being provided with a top wall, a bottom wall, side walls, and end walls, the bottom wall being adapted to rest on the upper peripheral edge of the container 1. The top wall, the side and end walls of the cover or top 3 are perforated as shown by the numeral 4 and the side and end walls are provided with depending flanges as shown at 5 to enclose the upper ends of the walls of the container 1.

By providing the cover or top 3 of hollow design, a compartment is formed therein which is designated by the numeral 6, which compartment is adapted to contain a deodorizing agent, such as coconut shell carbon or any other desired deodorizing agent. I prefer to utilize a deodorizing agent which will have a tendency to absorb contaminating odors. In order to provide a means for introduction to and removal from the chamber 6 of the deodorizing agent, I provide one end wall thereof as a removable wall, the same being designated by the numeral 7. This removable end wall of course forms an enclosure and is slidable in grooves 8 formed in the top and bottom walls of the cover 3, as clearly shown in Figures 1 and 4 of the drawing. This sliding closure 7 is provided, as shown, with the perforations 4 the same as the other walls of the cover and has formed on the outer face thereof a finger piece 9 to readily slide the same to an open position, as shown in Figure 4 of the drawing. Any desired means may be provided for retaining the closure 7 in its closed position, but for illustrative purposes I have shown the one end thereof at the inner face provided with a slight projection as shown by the numeral 10 which forms a shoulder abutting the inner face of the one side wall of the cover 3 when the closure 7 is moved to its closed position, as shown in Fig. 2 of the drawing. If a slight play is allowed between the walls of the member 3 and the closure 7, the closure may be readily moved to its open position but if no such play is provided and the member 3 and the closure 7 therefore are formed of plastic material there will, obviously, be a resilience inherent in the material so that by forcing the closure 7 outwardly from the finger piece 9, the shoulder 10 may be moved out of engagement with the wall top. In other words, while the closure 7 may be held in frictional contact with the adjacent walls, this contact may be overcome by pressure and slight resilience of the material of which the elements are made. I have already stated that the dish or container 1 may be made of glass, plastic or any other desired material and the same applies to the cover 3, although, I have lined the drawing to illustrate the dish or container 1 to be made of glass and the cover 3 to be made of plastic. I do not, of course, desire to be limited to any particular material but for all practical purposes both elements 1 and 3 may be made of plastic material and thus serve the purposes, or the container 1 may be made of glass and the cover of plastic as indicated with equally good results commercially and economically.

By providing a combination container and deodorizer, it will be seen that I have provided a container which may be used for supporting butter blocks and keep the same free from contaminating odors. Naturally any food may be supported in the container 1, the latter being of no particular shape, contour or size but adapted to contain any foods which may have a tendency to absorb odors. My improved deodorizing top or cover for such a container, with the deodorizing agent contained therein will absorb the odors and avoid the difficulties now encountered in refrigerators.

I have described hereabove a closure for the container or a top therefor which is provided with depending flanges to enclose the upper portions of the walls of the container. By providing such flanges, I also afford means for supporting the deodorizing top or cover for the container to be supported independently in a frigerator or elsewhere when removed from the container. Thus, it will be seen that when it is desired to provide a deodorizer within the ice box or refrigerator, the top of the cover for the container 1 may be removed from the latter and introduced at any point in the refrigerator or ice box for the desired purpose.

From the foregoing description of the construction of my improved device, the method of application, the use and operation will be thoroughly understood, and it will be seen that I have provided a comparatively simple, inexpensive and efficient means for carrying out the various objects of the invention.

While I have particularly described the elements best adapted to perform the functions set forth, it is apparent that various changes in form, proportion, and in the minor details of construction may be resorted to, without departing from the spirit or sacrificing any of the principles of the invention.

While I have here above described this device as a combination food container and deodorizer, it will be understood that the combination of deodorizer and container need not be entirely for food. Any other material may be received in the container and, if desired, the container could be enlarged to receive other materials, for instance, the combination could be made between a deodorizing top and a large container, hamper, or basket for soiled clothing so as to remove perspiration odors and moisture. Obviously, various other uses may be made of this deodorizer combination.

What I claim is:

A combined container cover and deodorant holder comprising a hollow body having a top and a bottom and marginal walls along its sides and one end, the other end of said body being open, the top and the marginal walls being perforated, flanges extending downwardly along side edges and end edges of the bottom wall, the top and the bottom and the one side wall being formed internally with registering grooves adjacent the open end of the body and the other side wall being foreshortened and forming a recess with which ends of the grooves in the top and the bottom communicate a closure fitted into the grooves of the top and the bottom through said recess and slidable longitudinally into and out of a closed position in which its inner end fits into the groove of the grooved side wall, and a finger-engaging member projecting from the outer surface of said closure and movable through the recess during opening and closing movement of the closure.

ALBERT SABATH.

REFERENCES CITED

The following references are of record in the file of this patent:

UNITED STATES PATENTS

| Number | Name | Date |
|---|---|---|
| 265,609 | Johnston | Oct. 10, 1882 |
| 280,844 | McIntyre | July 10, 1883 |
| 1,787,231 | Bacon | Dec. 30, 1930 |
| 1,843,514 | Levy | Feb. 2, 1932 |
| 1,942,900 | Peters | Jan. 9, 1934 |
| 1,949,453 | Crimmel et al. | Mar. 6, 1934 |